United States Patent [19]

Tsuchiya

[11] Patent Number: 5,583,996
[45] Date of Patent: Dec. 10, 1996

[54] METHOD AND SYSTEM FOR SHORTCUT ROUTING OVER PUBLIC DATA NETWORKS

[75] Inventor: Paul F. Tsuchiya, Lake Hopatcong, N.J.

[73] Assignee: Bell Communications Research, Inc., Morristown, N.J.

[21] Appl. No.: 33,638

[22] Filed: Mar. 16, 1993

[51] Int. Cl.⁶ ........................................................ G06F 13/00
[52] U.S. Cl. ............................ 395/200.15; 395/200.16; 370/258; 370/404; 340/827
[58] Field of Search ........................... 395/800, 200, 395/325; 364/DIG. 1; 340/827, 825.52; 370/94.1, 58.3, 60

[56] References Cited

U.S. PATENT DOCUMENTS

| | | | |
|---|---|---|---|
| 4,736,363 | 4/1988 | Aubin et al. | 370/60 |
| 4,740,954 | 4/1988 | Cotton et al. | 370/60 |
| 5,095,480 | 3/1992 | Fenner | 370/94.1 |
| 5,103,444 | 4/1992 | Leung et al. | 370/60 |
| 5,115,495 | 5/1992 | Tsuchiya et al. | 395/200 |
| 5,253,161 | 10/1993 | Nemirovsky et al. | 364/402 |
| 5,293,488 | 3/1994 | Riley et al. | 395/200 |
| 5,347,272 | 9/1994 | Ota | 340/827 |
| 5,365,520 | 11/1994 | Wang et al. | 370/60 |
| 5,408,618 | 4/1995 | Aho et al. | 395/325 |
| 5,442,633 | 8/1995 | Perkins et al. | 370/94.1 |

OTHER PUBLICATIONS

International Standards Organization, *End System to Intermediate System Routing Information Exchange Protocol for Use in Conjunction with ISO 8878*, ISO 10030.

D. Plummer, *An Ethernet Address Solution Protocol-or--Converting Network Protocol Addresses to 48 bit Ethernet Addresses for Transmission on Ethernet Hardware*, RFC 826 USC Information Sciences Institute, pp. 1–10, Nov. 1982.

F. Kamoun and L. Kleinrock, *Hierarchical Routing for Large Networks*, pp. 155–174, 1977.

M. Schwartz, *Computer Communication Network Design and Analysis*, pp. 193–209, 1977.

*Primary Examiner*—Alyssa H. Bowler
*Assistant Examiner*—Walter D. Davis
*Attorney, Agent, or Firm*—Joseph Giordano; James W. Falk

[57] ABSTRACT

A system and method are disclosed for transmitting a packet from a source node S in a first stub 300 to a destination node D in a second stub 306 of an internet communications network 200. The first stub 300 is connected with a public data network (PDN) 210 by a first access point node Ra and the second stub 306 is connected with the PDN 210 by a second access point node Rd. The first access point node Ra, writes its PDN subnetwork address in the packet. The first access point node Ra then transmits the packet via a sequence of one or more intermediary access point nodes Rb, Rc on a base path until the packet reaches the second access point node Rd. The second access point node Rd receives the packet via the base path. The second access point node Rd stores the PDN subnetwork address of the first access point node Ra (contained in the packet) in an entry 131 of shortcut table 130 maintained at the second access point node Rd. Thereafter, the second access point node Rd can transmit a second packet back to the first access point node Ra by transmitting the packet to the first access point node Ra using the PDN subnetwork address of the first access point node Ra stored in the shortcut table entry 131.

4 Claims, 4 Drawing Sheets

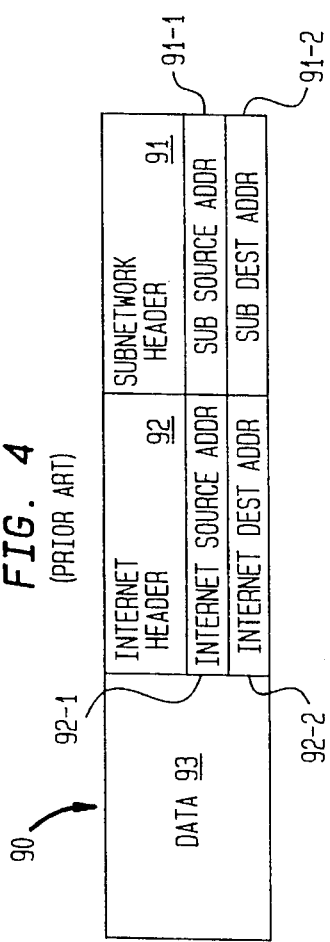

FIG. 5
(PRIOR ART)

| INTERNET DEST ADDR | PDN SUB ADDR OF NEXT NODE | SUBNET |
|---|---|---|
| $31_I$ | $31_{PDN}$ | PDN |
| $32_I$ | $31_{PDN}$ | PDN |
| $33_I$ | $31_{PDN}$ | PDN |
| $34_I$ | $31_{PDN}$ | PDN |
| $41_I$ | $41_{PDN}$ | PDN |
| $42_I$ | $41_{PDN}$ | PDN |
| $51_I$ | $51_{PDN}$ | PDN |
| $52_I$ | $51_{PDN}$ | PDN |
| $21_I$ | "DON'T CARE" | 25 |
| $22_I$ | "DON'T CARE" | 25 |
| $23_I$ | "DON'T CARE" | 25 |

FIG. 4
(PRIOR ART)

| INTERNET HEADER 92 | SUBNETWORK HEADER 91 |
|---|---|
| INTERNET SOURCE ADDR | SUB SOURCE ADDR |
| INTERNET DEST ADDR | SUB DEST ADDR |
| DATA 93 | |

FIG. 12

| INTERNET ADDR | PDN SUB SHORTCUT ADDR | RETURN SHORTCUT KNOWN? FLAG |
|---|---|---|
| $Ra_I$ | $Ra_{PDN}$ | NO |

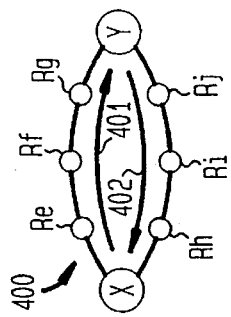

METHOD AND SYSTEM FOR SHORTCUT ROUTING OVER PUBLIC DATA NETWORKS

FIELD OF THE INVENTION

The present invention relates to routing data in a large communications network that has at least two smaller networks, called stubs, connected together by an intervening public data network. In particular, the present invention relates to a robust and efficient dynamic method for determining optimal or "shortcut" communication paths across the public data network between nodes in different stubs.

BACKGROUND OF THE INVENTION

FIG. 1 depicts a communications network 10 called an internet. The internet 10 includes a number of stubs 20, 30, 40, and 50. Each stub 20, 30, 40, and 50 is a smaller, subsumed communications network. The stub 20 comprises the nodes 21,22,23, the stub 30 comprises the nodes 31,32, 33,34, the stub 40 comprises the nodes 41,42, and the stub 50 comprises the nodes 51,52. The nodes 21–23, 31–34, 41–42, and 51–52 within each stub 20, 30, 40, and 50 are interconnected by a respective subnetwork 25, 35, 45, or 55 of the stub. For example, the nodes 21–23 are interconnected by the subnetwork 25 of the stub 20. As used herein, the term "subnetwork" refers to the communications lines, switches, etc. necessary for establishing internodal communication amongst the nodes interconnected by that particular subnetwork. For example, the subnetwork 25 can establish communications between any of the nodes 21–23 within the stub 20.

FIG. 2 depicts a node, e.g., the node 32 of the internet 10, in greater detail. As depicted, each node comprises a CPU or processor 71, a memory 72, and one or more input/output ports 73-1, 73-2, . . . , 73-n which are interconnected to one another via a bus 74. The input/output ports 73-1, 73-2, . . . , 73-n may be connected to the input/output ports of another node (e.g., the node 31) via a subnetwork (e.g., the subnetwork 35). The processor 71, among other things, controls the transmission of data between the memory 72 and the input/output ports 73-1, 73-2, . . . , 73-n. The processor 71 also controls the transmission of data from the input/output ports 73-1, 73-2, . . . , 73-n to other nodes. For example, the processor 71 can cause data stored in the memory 72, to be transmitted via the bus 74 to a particular input/output port, e.g., the input/output port 73-2. The processor 71 can then cause the input/output port 73-2 to transmit the data via the subnetwork 35 to a second node, e.g., the node 31. The data may be received in an input/output port at the node 31 and then transferred via the bus at that node 31 into the memory thereat under the control of the processor of the node 31.

It is also possible to transmit data from the node 31 to the node 32 by transmitting the data from the node 31 to the node 33, and then from the node 33 to the node 32. The transmission between each pair of nodes, e.g., from the node 31 to the node 33, is achieved in the above described manner.

The node at which data is initially generated and transmitted (e.g., the node 32) is called the source node. The node to which the data is ultimately destined (e.g., the node 31) is called the destination node. All other nodes between the source and destination node through which the data may pass (e.g., the node 33) are referred to as intermediary nodes.

Illustratively, data transmitted between nodes via a subnetwork within a particular stub is organized into packets. Such a packet 80 is depicted in FIG. 3. The packet contains one or more headers 81, 82 and data 83. One header 81 of the packet 80 is associated with the subnetwork over which the packet is to be transmitted and is called the subnetwork header. This subnetwork header contains control information including information necessary to direct the packet to its destination within that particular stub. Each node connected to the subnetwork is assigned a subnetwork address or identifier which is recognized by every other node connected to the subnetwork. The subnetwork header typically contains the subnetwork address of the source node, called the source address, and the subnetwork address of the destination node, called the destination address.

When a source node transmits a packet to a destination node in the same stub, the source node places its subnetwork address in the subnetwork source address field 81-1 (FIG. 3). Furthermore, the source node places the subnetwork address of the destination node in the subnetwork destination address field 81-2 of the packet 80. Thus, the source node must know or determine the subnetwork address of the destination node. In the case that the stub containing the source and destination nodes is an Ethernet network, the source node may already store the subnetwork address of the destination node in the memory of the source node. If the source node does not already store the destination address, the source node can transmit a query message to all nodes of the stub. The query message identifies the destination node and requests that the destination node transmit its subnetwork address to the source node. Upon receiving the query message, the destination node transmits its subnetwork address to the source node. All other nodes in the stub ignore the query message. Using the subnetwork address of the destination node, the source node then transmits its packet to the destination node.

When a packet is received at a node, the processor at the node illustratively determines if the node has the same subnetwork address as the destination address of the packet. If so, the processor at the node determines that the packet has reached its destination within that particular stub. If the destination address is different from the node's subnetwork address, the processor determines that the packet is not at its destination within that stub. The processor then determines the appropriate manner for transmitting the packet so that the packet reaches its destination node.

Often it is desirable to transmit packets from a source node in one stub to a destination node in another stub in the internet 10 of FIG. 1. To that end, each stub 20, 30, 40 and 50 has one or more access point nodes 21, 31, 34, 41, and 51, respectively, which are interconnected by a separate transit or backbone subnetwork called a public data network or PDN 60. A transit or backbone subnetwork is a subnetwork which may be used for transmitting packets between stubs. Thus, it is possible to transmit a packet from the node 23 in the stub 20 to the node 33 in the stub 30 by first transmitting the packet from the node 23 to the node 21 via the subnetwork 25. The packet is then transmitted from the node 21 to the node 31, via a backbone subnetwork in the form of the PDN 60, and from the node 31 to the node 33 via the subnetwork 35 in the stub 30. An access point node which receives a packet from a stub and retransmits the packet via the PDN 60, e.g., the node 21, is referred to as an entry point node of the PDN 60. An access point node which receives a packet from the PDN 60 and retransmits the packet via the subnetwork of a stub, e.g., the node 31, is referred to as an exit point node of the PDN 60.

In the internet 10, it is assumed that packets may not be transmitted from an access point node in a first stub to an access point node in a second stub via the subnetwork of a third stub. In other words, if a packet is received at an access point node of a third stub from the PDN 60 it may only be retransmitted therefrom via the subnetwork of the third stub to a destination node in that stub. If such a received packet is destined to a node in another stub, it may only be retransmitted from the access point node of the third stub via the PDN 60.

The PDN 60 may be a connection-less or a connection oriented subnetwork. An example of a connection oriented PDN 60 would be a telephone network.

Like the subnetworks 25, 35, 45 and 55, the PDN 60 provides a PDN subnetwork address for each access point node 21, 31, 34, 41, and 51. Typically, the subnetworks 25, 35, 45, 55 and the PDN subnetwork 60 utilize different addressing schemes. Thus, each node 21–23, 31–34, 41–42, and 51–52 of the internet 10 is further assigned an internet address. Furthermore, packets may be transmitted with internet headers containing the internet addresses of the source and destination nodes. Such an internet packet 90 is depicted in FIG. 4 with a subnetwork header 91, an internet header 92 and data 93. The internet header 92 contains the internet address of the source and destination nodes in an internet source address field 92-1, and internet destination address field 92-2, respectively.

Subnetwork addresses are recognizable only by the nodes connected to that particular subnetwork. Internet addresses have significance over the entire internet 10. The internet address of a packet's destination node may be used to determine whether the packet must be transmitted via the PDN 60 in order to reach the destination node. The internet address of a packet's destination node may also be used at a first access point node to direct a received packet to a second access point node via the PDN 60. That is, suppose a first entry point node receives a packet via a first stub but must transmit the packet to a second exit point node in a second stub via the PDN 60. The first access point node may use the internet destination address of the packet to determine the PDN subnetwork address of the second access point node. For example, suppose the node 21 receives, via the subnetwork 25, a packet from the node 23 having the internet destination address for the node 42. When the node 21 receives the packet, the node 21 uses the internet destination address in the internet destination address field 92-2 (FIG. 4) of the packet to determine over which subnetwork to retransmit the packet. In this case, the node 21 determines that the packet must be retransmitted via the PDN 60 to reach the node 41, which is the next node on the path to the node 42. If the node 21 determines that the packet must be retransmitted via the PDN 60, then the node 21 uses the internet destination address of the packet to determine the PDN subnetwork address of the next node on the path to the node 42. In this case, the node 21 determines the PDN subnetwork address of the node 41.

In order for an entry point node, such as the node 21, to make these two determinations, each access point node illustratively stores an internet routing table, such as the internet routing table 85 shown in FIG. 5. FIG. 5 shows an illustrative internet routing table at the node 21, having an entry 85-1, 85-2, 85-3, 85-4, 85-5, 85-6, 85-7, 85-8, 85-9, 85-10, and 85-11 for each node of the internet 10. In the alternative, where there are many nodes on the internet 10, each node stores entries for only some of the nodes or provides individual entries for different subsets of nodes, or both. In FIG. 5, each entry has a first field which stores the internet destination address of a different node. The subscript I is used to designate internet addresses, i e., "31$_I$," means the internet address of the node 31. Each entry has a second field which stores the PDN subnetwork address of the next node on the path to the destination node having the corresponding internet destination address. In FIG. 5, the subscript PDN is used to designate PDN subnetwork addresses, i e., "31$_{PDN}$" means the PDN subnetwork address of the node 31. Furthermore, each entry has a third field which stores an indicator of the subnetwork over which a packet must be retransmitted. The entries 85-9, 85-10, and 85-11 correspond to nodes 21-23 which are connected to the node 21 via the subnetwork 25, not the PDN 60 as indicated by the third field of these entries. The second field of each of these entries is not used for routing the packets (rather, the packets are routed within the stub 20 as discussed above) as indicated by "don't care" in FIG. 5.

Continuing with the above example wherein a packet is transmitted from node 23, to node 21, to node 41, to node 42, the processor at the node 21 searches the table 85 for the entry corresponding to the internet destination address contained in the packet, i.e., the entry 85-6 which stores the internet address of the node 42. The processor of the node 21 examines the third field of this entry 85-6 and determines that the packet must be retransmitted via the PDN 60. The processor at the node 21 then uses the PDN subnetwork address stored in the next node field of the retrieved entry 85-6 to retransmit the packet to the next node on the path to the node 42, i.e., the node 41, via the PDN 60.

In the alternative, the entry point node 21 may not know the PDN subnetwork address of the exit point node 41. In other words, the node 21 does not know the direct optimal path between the entry point node 21 and the exit point node 41. Instead, the entry point node 21 must transmit the packet to the exit point node 41 via a sequence of at least one intermediary access point node. For instance, instead of the PDN subnetwork address of the exit point node 41, the entry 85-6 may store the PDN subnetwork address of the access point node 31 in its next node field. The entry point node 21 would thus transmit the packet to a first intermediary access point node, i.e., to the access point node 31. The access point node 31 then illustratively consults its internet routing table to determine if it knows the PDN subnetwork address of the exit point node 41. If so, the packet is transmitted directly to the exit point node 41. If not, the intermediary access point node 31 may transmit the packet to yet another intermediary access point node in a similar fashion as described above. Thus, the packet is transmitted from intermediary access point node to intermediary access point node in the PDN 60 until it arrives at an intermediary access point node which knows the PDN subnetwork address of the exit point node 41.

The overhead in determining, at the entry point node, the PDN subnetwork address of the exit point node of a packet (i.e., the optimal path across the PDN 60) depends on the size of the internet. In the case of small, broadcast local area networks (LANs), the determination of the LAN subnetwork address of any desired destination node is a simple task. See, D. Plummer, "An Ethernet Address Solution Protocol—or—Converting Network Protocol Addresses to 48 bit Ethernet Addresses for Transmission on Ethernet Hardware," RFC 826 USC Information Sciences Institute, November, 1982. This is because broadcast LANs interconnect a small number (hundreds) of nodes and posses a simple, low overhead mechanism for "searching" for the LAN subnetwork addresses of other nodes. However, on a very large, general topology PDN subnetwork, the task of determining subnetwork destination addresses is more difficult. The Public Data Network (PDN) may be connected to tens of thousands of nodes rendering the task of distributing up-to-date PDN subnetwork addresses about each node to each other node highly inefficient. Thus, in a large PDN, the nodes can only maintain the PDN subnetwork address of a subset of nodes. This means that an entry point node often does not know the PDN subnetwork address of the exit point node and thus cannot transmit a packet directly thereto via the optimal path. Instead, the packet must be transmitted from the entry point node to the exit point node via a sequence of intermediary access point nodes of the PDN as described above. Moreover, although any access point node should be capable of communicating with any other access point node via the PDN, most access point nodes are unlikely to communicate with the majority of the other access point nodes. It is thus unnecessary for each access point node to maintain information about every other access point node.

Several solutions for the above problem been proposed, i.e., for determining, at an entry point node, the PDN subnetwork address of the exit point node. See, International Standards Organization, "End System to Intermediate System Routing Information Exchange Protocol for Use in Conjunction with ISO 8878," ISO 10030. A first solution has been proposed for an internet having stubs which are each connected with a PDN by only one access point node. The internet address assigned to each node contains the PDN subnetwork address of the corresponding access point node. Thus, it is a simple matter to determine, at an entry point node, the PDN subnetwork address of the exit point node which connects the stub containing the destination node. The entry point node simply examines the internet address of the destination node of the packet and extracts the PDN subnetwork address of the exit point node therefrom.

In a second solution, a small number of nodes are designated as "route server nodes". All non-route server nodes of the internet advertise the subnetworks and stubs they can reach to the route server nodes to which they are connected. The route server nodes, in turn, exchange this received information with other route server nodes.

The second solution works as follows. Suppose a non-route server node X is an access point node to the PDN for a source node S which desires to transmit a packet to a destination node D in another stub. In such a case, the source node S transmits a packet to the access point node X via a subnetwork. The node X transmits the packet to the route server node with which it is connected. The route server node determines the PDN subnetwork address of the exit point node Y that connects the stub containing the destination node D with the PDN, for example, by consulting its internet routing table (FIG. 5). The route server node then transmits the packet to this node Y (which in turn transmits the packet to the node D). In addition, the route server node transmits a redirect packet back to the node X which contains the PDN subnetwork address of the node Y. The node X stores the subnetwork address of the node Y for later use in transmitting other packets to the node D. Thus, the node X can now transmit a packet directly to the node Y (i.e., via the optimal path).

Each of these solutions has drawbacks. In the first solution, the internet addresses must be very large. Thus, the solution is not applicable to many widely deployed subnetworks, such as those employing the DECNET, Appletalk or Novell IPX protocols which restrict the size of addresses. Furthermore, it is not possible to embed the PDN subnetwork address of the exit point node in the internet destination address if the PDN has stubs that have more than one access point node each to the PDN. This is significant because it is prudent to connect two nodes of even small stubs with the PDN for purposes of reliability, The second solution places a heavy load on the route server nodes in terms of handling routing updates, storing routes, forwarding packets and redirecting router nodes. Thus, each route server node is a potential bottleneck.

It is therefore an object of the present invention to provide for routing data in a PDN subnetwork of an internet which overcomes the disadvantages of the prior art.

SUMMARY OF THE INVENTION

This and other objects are achieved by the present invention. In one embodiment, the PDN has a sparse communications map which includes at least one path, called a base path, for transmitting packets between any two access point nodes connected via the PDN. Typically, the base path is not an optimal or direct path between the access point nodes but instead includes one or more intermediary access point nodes. According to this embodiment, a method is provided for transmitting a packet from a source node in a first stub to a destination node in a second stub. The first stub is connected with the PDN by a first access point node and the second stub is connected with the PDN by a second access point node. The method includes the following steps:

(1) routing the packet from the source node to the first access point node using the subnetwork of the first stub, (2) at the first access point node, writing the PDN subnetwork address of the first access point node in a shortcut header of the packet, (3) transmitting the packet via a base path, which typically includes a sequence of one or more intermediary access point nodes, until the second access point node is reached, (4) at the second access point node, receiving the packet via the base path and storing the PDN subnetwork address of the first access point node (contained in the packet) in a shortcut table at the second access point node, and (5) routing the packet from the second access point node to the destination node using the subnetwork of the second stub.

More specifically, the source node in a first stub routes a packet to the first access point node of the PDN. When the first access point node receives a packet from the source node, the first access point node writes its PDN subnetwork address in the packet, e.g., in a shortcut header of the packet. The first access point node then routes the packet via a base path to the second access point node, which base path typically includes the first access point node, a sequence of one or more intermediary access point nodes, and the second access point node. To that end, the first access point node illustratively uses an internet address of the destination node (contained in the packet) to retrieve an entry from an internet routing table maintained at the first access point node, which entry corresponds to the destination node. The first access point node uses the PDN subnetwork address in the next node field of the retrieved internet routing table entry to transmit the packet to the next access point node on the base path.

The next access point node receives the packet and determines if it connects the second stub (which contains the destination node) with the PDN. For example, the access point node can retrieve the entry of its internet routing table corresponding to the packet's internet destination address. If the entry stores an indication that the packet must be retransmitted via the subnetwork of a stub, rather than via the PDN subnetwork, then the access point node must connect the second stub with the PDN. In such a case, the access point node is the exit point node (i.e., the second access point node). Otherwise, the access point node is merely an intermediary access point node, which intermediary access point node transmits the packet to the next access point node on the base path to the second access point node. To that end, the intermediary access point node accesses its internet routing table to retrieve the entry corresponding to the packet's internet destination address (if it has not done so already to determine if it is the exit point node). Like the first access point node, the intermediary access point node uses the PDN subnetwork address in the next node field of the retrieved entry to transmit the packet to the next access point node on the base path to the second access point node. This process is repeated at each successive intermediary access point node on the base path to the second access point node until the packet is received at the second access point node.

Eventually, the packet arrives at the second access point node. The second access point node first determines that it is the exit point node, i.e., connected with the stub containing the destination node. The second access point node then retrieves the PDN subnetwork address of the first access point node contained in the packet and stores this address as a shortcut address in a shortcut table maintained at the second access point node. The shortcut address is stored in a shortcut table entry corresponding to the internet address of the packet's source node. The second access point node thereafter routes the packet to the destination node via the subnetwork of the second stub.

The above method for transmitting a packet from the first access point node to the second access point node causes the second access point node to learn a return, direct or optimal shortcut path back to the first access point node. Thereafter, if the second access point node has a packet to transmit to the first access point node, the second access point node can transmit the packet directly to the first access point node via the optimal shortcut path stored in the shortcut table rather than via the base path. For example, the second access point node can transmit a packet back to the first access point node by:

(1) at the second access point node, retrieving the entry from the shortcut table, and (2) transmitting the packet to the first access point node using the PDN subnetwork address of the first access point node stored in the retrieved entry.

It is also possible for the second access point node to write its PDN subnetwork address in a packet transmitted from the second access point node to the first access point node. In this fashion, when the packet arrives at the first access point node, the first access point node learns the optimal shortcut path to the second access point node. The PDN subnetwork address contained in the packet is then stored in a shortcut table maintained at the first access point node in an entry corresponding to the internet address of the source of the packet. Thereafter, the first access point node can retrieve the shortcut path from its shortcut table for transmitting a packet to the second access point node using the second access point node's PDN subnetwork address stored in the retrieved entry.

In short, a simple, dynamic method is provided for automatically discovering shortcut paths across a PDN between two access point nodes. Shortcut paths are only stored at access point nodes that have previously communicated with each other thereby reducing the storage requirements at each access point node. In addition, the invention is not dependent on the particular addressing scheme used in any subnetwork and operates transparently of each subnetwork protocol. The invention is thus easy to implement in an existing internet.

BRIEF DESCRIPTION OF THE DRAWINGS

FIG. 4 depicts a prior art packet with an internet header.

FIG. 5 depicts a prior art internet routing table.

FIG. 7 depicts an internet network with asymmetric base paths.

FIG. 8 depicts an internet routing table of the node Ra in the internet depicted in FIG. 6.

FIG. 9 depicts a packet with a shortcut header.

FIG. 9A depicts a second packet with a shortcut header.

FIG. 10 depicts an internet routing table of the node Rb in the internet depicted in FIG. 6.

FIG. 11 depicts a shortcut routing table of the node Rd depicted in FIG. 6.

FIG. 12 depicts a modified shortcut routing table of the node Rd according to another embodiment of the present invention.

DETAILED DESCRIPTION OF THE INVENTION

Figure 2:
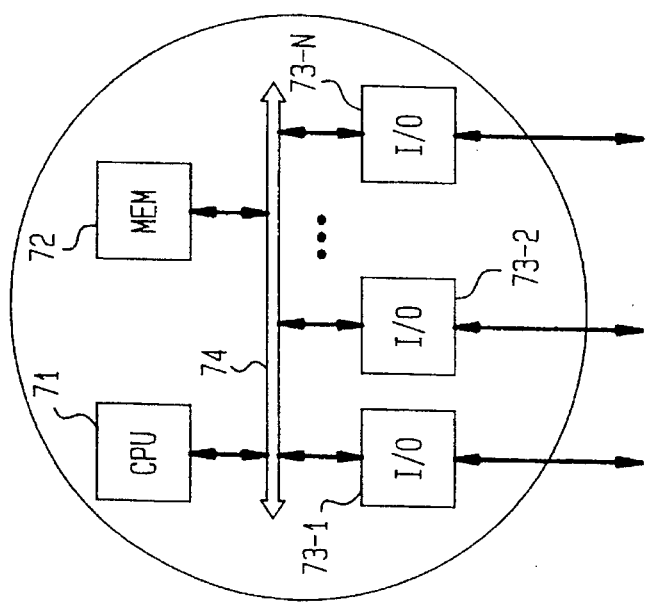
FIG. 2 depicts a prior art node of the internet network of FIG. 1 in greater detail.
Figure 3:
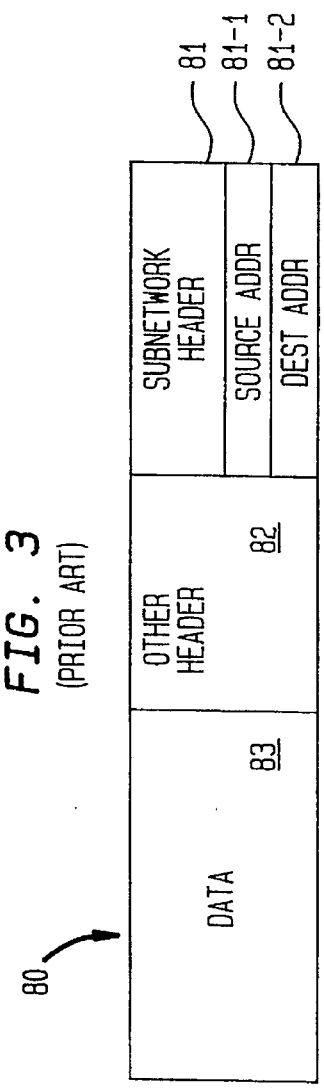
FIG. 3 depicts a prior art packet with a subnetwork header.
Figure 1:
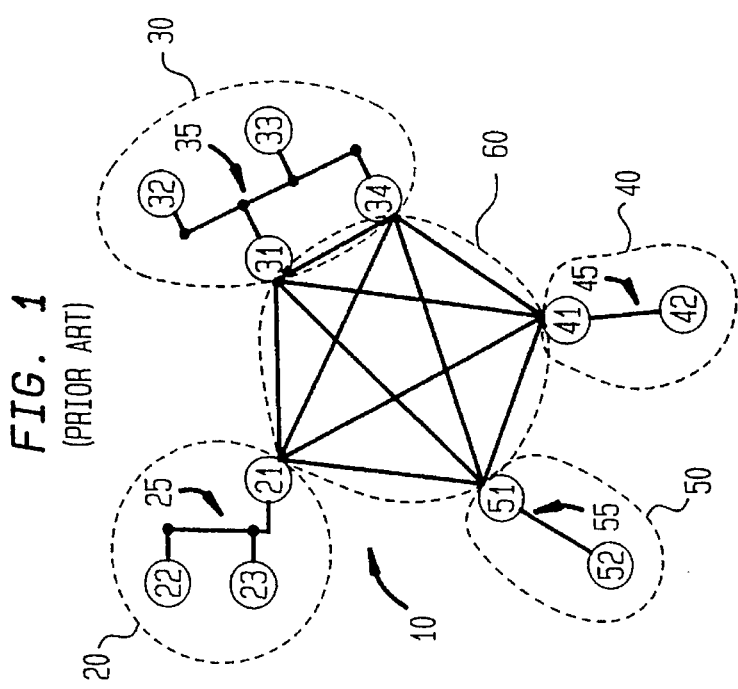
FIG. 1 depicts a prior art internet communications network.
Figure 6:
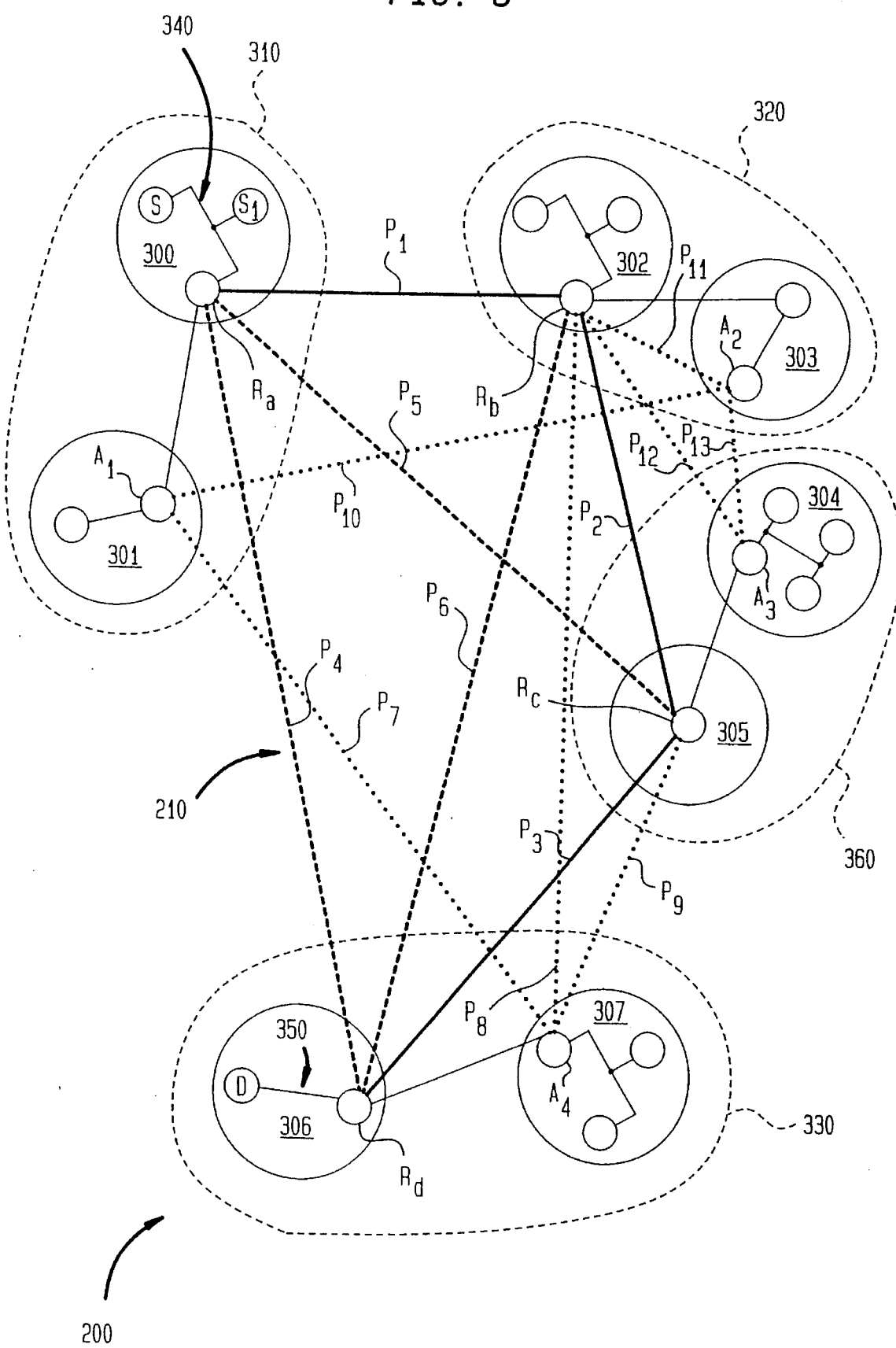
FIG. 6 depicts an internet network with a sparse communications map.

FIG. 6 shows an internet 200 which uses shortcut routing in accordance with the invention. The internet 200 comprises the stubs 300,301,302,303,304,305,306, and 307. Each stub contains one or more nodes, e.g., the stub 300 contains the nodes Ra, S and S1, and a subnetwork, e.g., the subnetwork 340, connecting the nodes Ra, S and S1 within that stub 300. The internet 200 also comprises the PDN subnetwork 210 for interconnecting the stubs 300–307. Illustratively, the PDN 210 includes the connections P1,P2, P3,P4,P5,P6,P7,P8,P9,P10,P11,P12, and P13.

According to one embodiment of the invention, it is presumed that each stub (e.g., the stub 300) is connected by at least one access point node (e.g., Ra) with the PDN. To reduce the amount of routing information maintained at the nodes that connect each stub with the PDN 210, it is advantageous to hierarchically cluster or group the stubs. For example, as shown in FIG. 6, The stubs 300, 301, 302, 303, 304, 305, 306 and 307 are grouped into four clusters 310, 320, 330, and 360. The node Ra is designated the access point node for the cluster 310, the node Rb is designated the access point node for the cluster 320, the node Rc is designated the access point for the cluster 360 and the node Rd is designated the access point node for the cluster 330. Therefore, the nodes A1 (in the stub 301), A2 (in the stub 303), A3 (in the stub 304), and A4 (in the stub 307) do not serve as access point nodes to the PDN 210. As such, the connections P7–P13 are not used and may be ignored.

After the access point nodes Ra,Rb,Rc, and Rd are chosen, each cluster is illustratively assigned an internet address prefix and each node of each stub is assigned an internet address which includes the prefix of its corresponding cluster. For example, a group of 256 stubs may be given the prefix "26" and assigned the internet addresses 26-0, 26-1, 26-2, ..., 26-255, respectively (where dash notation is used to separate fields which are, for example, one byte long). If more reduction is necessary, then another level may be added to the hierarchy (e.g., 26-0-0, 26-0-1, ..., 26-0-255, 26-1-0, 26-1-1, ..., 26-1-255, ..., 26-255-0, 26-255-1, ..., 26-255-255). Thus, approximately 65,000 stubs could be represented by one prefix 26.

Next, a sparse communications map is determined. In general, the communications map includes a number of direct communications paths between pairs of access point nodes. Illustratively, a direct path is not established between every two access point nodes. Rather, a minimal number of direct paths are established so that there is a path (but not necessarily an optimal path) between any two access point nodes. For example, a sparse communication map for the nodes Ra, Rb, Rc and Rd of a PDN 210 is depicted in the internet 200 of FIG. 6. As shown, there are six total possible direct paths P1 (between Ra and Rb), P2 (between Rb and Rc), P3 (between Rc and Rd), P4 (between Rd and Ra), P5 (between Ra and Rc), and P6 (between Rd and Rb). However, only three direct paths P1–P3 are included in the sparse communications map. Nevertheless, there is a base path between any two access point nodes, e.g., the base path Rd→Rc→Rb between the nodes Rd and Rb.

There is a great deal of freedom in clustering stub networks and establishing the sparse communications map. Although these two topics are not explored in detail herein, examples for performing each of these two steps may be found in F. KAMOUN & L. KLEINROCK, HIERARCHICAL ROUTING FOR LARGE NETWORKS, p.1 (1977), and M. SCWARTZ, COMPUTER COMMUNICATION NETWORK DESIGN AND ANALYSIS (1977), respectively. In general, address clustering according to geographic proximity is a good strategy. Furthermore, it is advantageous to form a sparse communications map including multiple base paths between any two access point nodes. Thus, if an intermediary access point node of a base path fails thereby disrupting communication over that base path, communication can be achieved via an alternate base path.

After the sparse communications map is formed, each of the access point nodes of the PDN 210 stores the base path to the other access point nodes of the PDN 210. Illustratively, each access point node does not store the entire sequence of access point nodes of each base path. Rather, each access point node simply stores the next node of the sequence of access point nodes of each base path to which it must transmit packets. For example, at the access point node Ra, the base path to the access point node Rd is: Ra→Rb→Rc→Rd. The access point node Ra determines that the next node of this sequence of access point nodes on the base path to the access point node Rd is the access point node Rb. Thus, the access point node Ra simply stores the access point node Rb for the base path to the access point node Rd.

Illustratively, each access point node stores the PDN subnetwork addresses of the next access point node (of the sequences of access point nodes) on the base paths in an internet routing table such as shown in FIG. 8. FIG. 8 depicts the internet routing table 100 stored at the access point node Ra. Illustratively the internet routing table 100 does not have a separate entry for each node of the internet 200. Rather, an entry is provided for a group or subset of nodes. For example, as shown, the internet routing table 100 has an entry 101, 102, 103, 104 corresponding to each cluster 320, 360, 330, and 310, respectively. Each entry has a first field which illustratively stores the internet address prefix of the access point nodes Ra-Rd of each cluster. Each entry also has a second field which stores the PDN subnetwork address of the next access point node on the base path to the access point node whose internet address prefix is stored in the first field. As depicted, at the access point node Ra, the first field of the entry 101 corresponding to the access point node Rd stores the internet address prefix of the access point node Rd. The second field of this entry 101 stores the PDN subnetwork address of the access point node Rb which is the next access point node on the base path to the access point node Rd. Illustratively, each field also has a third field which stores an indication of the subnetwork over which the node Ra should route a packet having the same internet destination address as stored in the first field.

As shown in FIGS. 6 and 8, the next access point node on the base path from the access point node Ra to each access point node Rb, Rc, or Rd is the access point node Rb. In the case that a single access point node is the next access point node on the base path to a subset of access point nodes, it may be advantageous to have one entry corresponding to that subset of access point nodes. That is, the first field stores the internet address prefix of each access point node in the subset and the second field stores the PDN subnetwork address of the next access point node on these base paths.

The operation of the invention is now discussed. Assume that each of the access point nodes Ra, Rb, Rc and Rd shown in FIG. 6 has an internet routing table similar to that shown in FIG. 8. Furthermore, assume that a source node S in the stub 300 desires to transmit a packet to a destination node D in the stub 306. The node S generates a packet, such as the packet 90 shown in FIG. 4, having an internet header 92, a subnetwork header 91 and data 93. The node S places its internet address in the internet source address field 92-1 and the internet address of the node D in the internet destination address field 92-2 of the internet header 92 of the packet. The node S places its subnetwork address in the subnetwork source address field 91-1 and the subnetwork address of the access point node Ra in the subnetwork destination address field 91-2 of the subnetwork header 91. The node S then transmits the packet to the access point node Ra via the subnetwork 340 using the subnetwork destination address of the access point node Ra (contained in the subnetwork destination address field 91-2).

When the packet is received at the access point node Ra, the access point node Ra determines if the packet must be retransmitted to another access point node via the PDN 210. For example, the access point node Ra illustratively compares its subnetwork address to the subnetwork destination address in the subnetwork destination address field 91-2 of the packet. Because they are the same, the access point node Ra determines that the packet is at its destination in the stub 300. However, the access point node Ra examines the internet destination address in the internet destination address field 92-2 of the packet and determines that the packet is destined to a node in a stub that is not directly connected to the access point node Ra. For example, the access point node Ra accesses its internet routing table 100 for an entry having the same internet address in its first field as the destination internet address of the packet. Assuming that internet destination addresses are assigned according to a hierarchy, the access point node Ra can simply retrieve the entry having the same internet address prefix as the prefix of the internet destination address of the packet. In this case, the internet destination address prefix of the packet matches that of the access point node Rd. Thus, the node Ra retrieves the entry 103. Next, the node Ra examines the indication stored in the third field of the retrieved entry. Because the third field stores an indication for the PDN 210, the node Ra determines that the packet must be retransmitted via the PDN 210 in order for it to reach its ultimate destination.

Thus, the access point node Ra transmits the packet via the PDN 210 to the exit point node (the access point node Rd) which connects the stub containing the destination node with the PDN 210. Assume that the access point node Ra only stores a base path to the access point node Rd and that each access point node Ra, Rb, Rc and Rd operates according to the present invention. The access point node Ra generates a packet, such as the packet 110 shown in FIG. 9, which is useful for conveying shortcut information. The packet 110 has a PDN subnetwork header 111, a shortcut header 113, an internet header 112 and data 114. The data 114 and internet header 112 contain identical information as the corresponding data 93 (FIG. 4) and internet header 92 (FIG. 4) of the packet transmitted by the node S. The access point node Ra illustratively writes its PDN subnetwork address in the source PDN subnetwork address field 111-1 of the PDN subnetwork header 111. The shortcut header 113 has a shortcut address field 113-1. The access point node Ra also writes its PDN subnetwork address in the shortcut address field 113-1.

The access point node Ra then transmits the packet 110 via the PDN 210 to the next access point node on the base path to the exit point node (i.e., the access point node Rd) of the PDN 210. To that end, the access point node Ra consults the table 100 of FIG. 8 for an entry corresponding to the internet destination address of the packet. Thus, the access point node Ra would retrieve the entry 103 which corresponds to the access point node Rd (unless the access point node Ra has already retrieved this entry in determining over which subnetwork to retransmit the packet). Using the PDN subnetwork address in the next node field of the retrieved entry, the access point node Ra then transmits the packet to the access point node Rb, i.e., the next node on the base path to the exit point node Rd.

When the access point node Rb receives the packet, it first determines if it is the exit point node, i.e., connected with the stub containing the destination node. If such were the case, then the access point node Rb would have to transmit the packet to the destination node via a subnetwork other than the PDN 210. Again, if the internet addresses are assigned according to a hierarchy, the access point node Rb can simply retrieve the entry of its internet routing table 120 (FIG. 10) having the same internet prefix as the internet destination address prefix of the packet. As shown in FIG. 10, the internet routing table stored at the access point node Rb has entries 121, 122, 123, 124 corresponding to the internet address prefixes for the access point nodes Ra, Rc, Rd, and Rb, respectively. The access point node Rb retrieves the entry 123 having the same internet destination address prefix as the packet, i.e., the prefix assigned to the access point node Rd. If the third field of this retrieved entry stores an indication for one of the stubs connected to Rb, the node Rb is the exit point node. In this case, the third field indicates that the packet must be retransmitted via the PDN 210. As such, the access point node Rb simply retransmits the packet to the next node on the base path to the exit point node. To that end, the access point node Rb uses the PDN subnetwork address stored in the next node field of the retrieved entry, to retransmit the packet to the next node on the base path, i.e., to the access point node Rc. The node Rb does not alter the shortcut address in the shortcut address field 113-1 of the packet 110.

The packet is then received at the access point node Rc. The access point node Rc carries out similar steps as described above for the access point node Rb. First the access point node Rc determines that it is not the exit point node. In this process, the access point node Rc consults its internet routing table for the entry corresponding to the prefix of the internet destination address of the packet. Then, using the PDN subnetwork address stored in the next node field of the retrieved entry, the access point node Rc retransmits the packet to the next node on the base path, i.e., the access point node Rd. Again, the node Rc does not alter the shortcut address contained in the shortcut address field 113-1 of the packet 110.

The packet is then received at the access point node Rd. The access point node Rd illustratively accesses its internet routing table (not shown) and retrieves the entry corresponding to the prefix of the internet destination address of the packet. The third field of this entry contains an indication for the stub 306. Thus, the access point node Rd determines that it is the exit point node. In this case, the access point node Rd retrieves the shortcut address from the shortcut address field 113-1 of the packet. This shortcut address is stored in a shortcut table 130 maintained at the access point node Rd. This shortcut table 130 is shown in FIG. 11. Each entry 131 of the shortcut table has two fields. The first field stores an internet address for a particular source node. Alternatively, if internet addresses are assigned according to a hierarchy, the first field advantageously stores the internet address prefix of the access point node connecting the stub containing the source node with the PDN 210. The access point node Rd stores the source internet address of the packet (i.e., the internet address of the node S) or its prefix (i.e., the prefix assigned to the access point node Ra) in the first field of the entry 131. The second field stores a shortcut address. The access point node Rd stores the shortcut address retrieved from the shortcut address field 113-1 of the packet 110 of FIG. 9, i.e., the PDN subnetwork address of the access point node Ra, in the second field of the entry 131 of the shortcut table 130 of FIG. 11. If an entry for the access point node Ra already exists, the shortcut address in the second field is simply updated.

It is possible for two entries to exist in the shortcut table 130 with different internet addresses in the first field but the same shortcut address in the second field. This is most likely to occur if internet addresses are not assigned according to a hierarchy. Thus, for example, if both the node A1 and the node S each transmitted a packet to destination nodes in the cluster 330, the node Ra would serve as the entry point node and the node Rd would serve as the exit point node. Thus, both packets would arrive at the node Rd with the same shortcut address (i.e., the PDN subnetwork address of the node Ra) stored in the subnetwork header. However, the internet source addresses (of the nodes A1 and S) might be different. Thus, the node Rd would create separate entries in the shortcut table 130 for the internet address of each node A1 and S. In such a case, it is desirable to have a single entry for both nodes S and A1 with the first field storing the set of internet address of all of the nodes accessible via the shortcut address (the internet addresses of the nodes A1 and S).

The access point node Rd then places the data 114 (FIG. 9) and internet source and destination addresses of the packet 110 into a subnetwork packet 90 (FIG. 4) suitable for transmission via the subnetwork 350 in the stub 306. The access point node Rd writes its subnetwork address in the subnetwork source address field 91-1 and the subnetwork address of the node D in the subnetwork destination address field 91-2 of the subnetwork header 91. The access point node Rd then transmits the packet to the node D via the subnetwork 350.

By virtue of the access point node Ra writing its PDN subnetwork address in the packet 110 (FIG. 9) transmitted to the access point node Rd, the access point node Rd learns a return shortcut path back to the access point node Ra. This shortcut path is stored in the shortcut table 130 (FIG. 11) at the access point node Rd in an entry 131 corresponding to the internet address prefix of the access point node Ra (or the internet address of the node S). Thus, if the access point node Rd has a packet to transmit via the PDN 210 to the access point node Ra, the access point node Rd can transmit the packet directly to the access point node Ra using the PDN subnetwork address of the access point node Ra. For example, suppose the node D has data to transmit to the node S. The node D transmits a packet, such as the packet 90 shown in FIG. 4, containing the data 93, an internet header 92, and a subnetwork header 91. The node D writes its internet address in the internet source address field 92-1, and the internet address of the node S in the internet destination address field 92-2. Furthermore, the node D writes its subnetwork address in the subnetwork source address field 91-1, and the subnetwork address of the access point node Rd in the subnetwork destination address field 91-2 of the packet. The node D then transmits the packet to the access point node Rd.

When the access point node Rd receives the packet, the access point node Rd determines that the packet must be transmitted via the PDN 210 to reach its ultimate destination. For example, the node Rd retrieves the entry from its internet routing table corresponding to the internet destination address prefix of the packet and examines the indication stored in the third field of this entry. Thereafter, the access point node Rd illustratively generates a packet similar to the received packet 90 (FIG. 4) which is appropriate for transmission via the PDN. The access point node Rd transfers the data from the received packet and places it in the generated packet. Furthermore, the access point node Rd writes its PDN subnetwork address in the source address field 91-1 of the generated packet.

The access point node Rd accesses its shortcut table 130 (FIG. 11) to retrieve the entry corresponding to the internet destination address of the packet, if such an entry exists. The access point node Rd retrieves the entry 131 corresponding to the access point node Ra. The access point node Rd illustratively writes the PDN subnetwork address (of the access point node Ra) stored in the shortcut address field of the retrieved entry in the destination address field 91-2 (FIG. 4) of the packet. The access point node Rd then uses the PDN subnetwork address (of the access point node Ra) stored in the shortcut address field of the retrieved entry 131 for transmitting the packet directly to the access point node Ra.

The access point node Ra receives the packet and determines if it is the exit point node. Again, the access point node Ra retrieves the entry 104 (FIG. 8) from its internet routing table 100 corresponding to the internet destination address prefix of the packet. In this case, the third field of the entry 104 indicates that the node Ra must retransmit the packet via the subnetwork 340 of the stub 300. Thus, the access point node Ra generates a packet 90 (FIG. 4) similar to the received packet which is appropriate for transmission via the subnetwork 340. The access point node Ra transfers the data and internet source and destination addresses from the received packet to the generated packet. The access point node Ra writes its subnetwork address in the subnetwork source address field 91-1 and the subnetwork address of the node S in the subnetwork destination address field 91-2 of the subnetwork header 91. The access point node Ra then transmits the packet to the node S.

In the case that the access point node Rd fails to find a shortcut table entry corresponding to the internet destination address of the packet, the access point node Rd transmits the packet via the base path. In other words, the access point node Rd consults the entry of its internet routing table corresponding to the internet destination address contained in the packet. Using the PDN subnetwork address in the next node field of the retrieved entry, the access point node Rd retransmits the packet to the next node on the base path to the access point node Ra, i.e., the access point node Rc. The packet then passes through the sequence of intermediary access point nodes on the base path as described above until the packet reaches the access point node Ra. The access point node Ra then retransmits the packet to the node S.

It is also possible for the access point node Rd to write its PDN subnetwork address in the packet transmitted to the access point node Ra so that the access point node Ra learns the shortcut path to the access point node Rd. In such a case, the access point node Rd generates a packet, such as the packet 110 of FIG. 9. The access point node Rd retrieves the information in the data field 93 (FIG. 4) and internet header 92 (FIG. 4) of the packet received from the node D. The access point node Rd writes this information in the data field 114 and internet header 112 of the packet 110. In the above embodiment, the packet 110 may then be transmitted directly to the access point node Ra via the shortcut path thereto. The access point node Ra would then retrieve the shortcut address from the packet 110 and store the shortcut address in a shortcut table maintained at the access point node Ra (which is similar to the shortcut table 130 of FIG. 11). The access point node Ra would store the internet destination address prefix of the access point node Rd (retrieved from the internet destination address of the packet) in the first field of the shortcut table entry. The access point node Ra would store the shortcut address (the PDN subnetwork address of the access point node Rd) in the second field of the entry. Thereafter, the access point node Ra can transmit packets directly to the access point node Rd using the shortcut address.

In the above process, it may be appreciated that the addressing used by the various subnetworks 340, 350 and the PDN 210 need not be altered in any way. Nor must the underlying transmission protocols of these subnetworks be changed. Rather, the access point nodes Ra, Rb, Rc and Rd simply direct packets to each other in a different manner. The invention thus operates transparently of the different subnetworks 340, 350 and the PDN 210 and can be easily adapted for use with virtually any currently deployed subnetwork. Furthermore, because the internet addresses of the nodes in the stubs need not contain the PDN subnetwork address of the specific access point nodes that connect the corresponding stubs to the PDN 210, there are no constraints on the configuration of the internet 200. In other words, the invention may be used in an internet 200 having stubs that are connected via more than one access point node with the PDN 210.

In each of the above examples, the shortcut address is written in a shortcut header "appended" to an ordinary internet packet. In other words, the access point node transmits a shortcut in a packet containing both data and shortcut information. This is advantageous because no additional packets are required for transmitting shortcut information. Rather, the shortcut information is "piggy-backed", i.e., transmitted with an existing packet.

In an alternative embodiment, shortcut information (the shortcut address) is transmitted in a separate packet from the packet containing data. For instance, in the above example, when the node Ra receives a packet from the node S, the node Ra illustratively generates a similar packet 90 (FIG. 4) suitable for transmission on the PDN. The packet 90 has similar information stored in its data 93 and internet header 92 as in the packet received from the node S. The node Ra writes its PDN subnetwork address in the field 91-1 and transmits the packet to the node Rb.

In addition, the node Ra generates a packet 150 such as depicted in FIG. 9A. The packet 150 has an internet header 152, a shortcut header 153 and a PDN subnetwork header 151 similar to the packet 110. The node Ra writes the same information in the internet header 152 as in the packet received from the node S. The node Ra also writes its PDN subnetwork address in the shortcut address field 153-1 and the PDN subnetwork source address field 151-1 of the packet 150. Then, both packets 90 and 150 generated by the node Ra are transmitted via the base path to the node Rd.

The shortcut header may also contain a query field 153-2. An entry point node which does not know a return shortcut address writes a query message in this field 153-2 requesting that the exit point node transmit back to the entry point node a return shortcut path. For instance, in the above example, the node Ra would write a query message in a shortcut packet 150 transmitted to the node Rd requesting that the node Rd transmit back a shortcut address thereto. When such a shortcut packet 150 is received at the node Rd, the node Rd transmits back to the node Ra a packet, such as the packet 150, containing a shortcut address (i.e., the PDN subnetwork address of the node Rd). The node Rd may transmit the packet 150 back immediately or may wait for a certain event, e.g., receiving a threshold number of packets containing queries from the node Ra.

The above embodiment is advantageous in the case that packets are transmitted in only one direction, e.g., from S to D, but not in the opposite direction. The node Rd thus transmits a shortcut path to the node Ra even though the node Rd has no packets to transmit to the node Ra. In the absence of this feature, the node Ra might never learn the shortcut to the node Rd.

In an alternative embodiment, shortcut paths to a stub that has asymmetric base paths can be learned. A stub with asymmetric base paths is a stub which receives packets from one access point node but transmits packets from a different access point node. Consider the PDN 400 of FIG. 7 having the access point nodes Re, Rf, Rg, Rh, Ri, and Rj. As shown, a stub X is connected with the PDN 400 by the access point nodes Re and Rh. The stub Y is connected with the PDN 400 by the access point nodes Rg and Rf. The sparse communications map provides the following base path 401 from the stub X to the stub Y: Re→Rf→Rg. However, the sparse communications map provides a different base path 402 from the stub Y to the stub X: Rh→Ri→Rj.

Assume no shortcuts are initially known. If a source node in the stub X has a packet to transmit to a destination node in the stub Y, the packet will be transmitted from Re to Rg via the base path 401. The access point node Re also transmits a shortcut path (either in the same packet 110 (FIG. 9) or in a separate packet 150 (FIG. 9A)), which is received and stored in a shortcut table at the access point node Rg. On the other hand, if a source node in the stub Y has a packet to transmit to a destination node in the stub X, the packet will be transmitted from Rj to Rh via the base path 402. The access point node Rj also transmits a shortcut path, which is received and stored in a shortcut table at the access point node Rh.

Ordinarily, the access point nodes Re and Rj will never learn the shortcut paths to the access point nodes Rg and Rh, respectively. Illustratively, however, each access point node maintains a count of the number of times a packet is received from each other access point node via the base path. For example, each time the access point node Re transmits a packet via the path 401 to the node Rg, the node Rg increments a counter associated with the node Re. When the count reaches a certain threshold number, the node Rg transmits a packet, e.g., the packet 150, to the node Re containing the shortcut path thereto (i.e., the PDN subnetwork address of the node Rg).

In an alternative embodiment of the invention, shortcuts are only learned from packets arriving via the base path. This is desirable if the internet has access point nodes which, for purposes of security, monitor packets transmitted between two other access point nodes. For example, suppose the access point node Rc monitors the packets transmitted between the access point nodes Rb and Rd in order to prevent certain packets (e.g., packets containing classified information) from being transmitted therebetween. Without the above restriction, the access point node Rb could transmit a packet with a shortcut header directly to the access point node Rd thereby causing the access point node Rd to learn a shortcut path to the access point node Rb. Thus, packets would thereafter be transmitted directly from the access point node Rd to the access point node Rb without passing through the access point node Rc. The security measures provided by the node Rc would therefore be circumvented.

In this embodiment, the shortcut header is provided with a flag field 113-2 (FIG. 9). Consider the case where none of the access point nodes stores a shortcut to any other node. Initially, when the access point node Ra of FIG. 6 receives a packet from the stub 300 for retransmission via the PDN 210, the access point node Ra writes its PDN subnetwork address in the shortcut address field 113-1 (FIG. 9) of the packet. In addition, the access point node Ra writes a flag in the flag field 113-2 (FIG. 9) of the shortcut header 113 (FIG. 9) to indicate that the access point node Ra does not know of a shortcut path to the exit point node (the access point node Rd).

When the packet is received from the PDN 210 by the access point node Rd, both the shortcut address and the flag are retrieved from the packet and stored in a shortcut table entry 141 of the shortcut table 140 shown in FIG. 12. As shown, the shortcut table 140 is the same as the table 130 (FIG. 11) except that the shortcut table 140 has an extra field for storing the flag. Then, if a packet is transmitted in the opposite direction from the access point node Rd to the access point node Ra, the access point node Rd retrieves the shortcut table entry 141 associated with the access point node Ra. However, because the flag stored in this entry 141 indicates that the access point node Ra does not know a shortcut path to the access point node Rd, the access point node Rd transmits the packet via the base path as if no shortcut path were known. Prior to transmitting the packet, the access point node Rd writes its PDN subnetwork address in the shortcut address field 113-1 (FIG. 9) of the packet and writes a flag in the flag field 113-2 (FIG. 9) indicating that the access point node Rd knows a shortcut path to the access point node Ra. Furthermore, the access point node Rd may update the retrieved shortcut table entry 141 (FIG. 12) so that the flag indicates that the access point node Ra knows of a shortcut path to the access point node Rd.

When the packet is received via the base path at the access point node Ra, the access point node Ra creates a shortcut table entry corresponding to the access point node Rd. The access point node Ra stores the PDN subnetwork address of the access point node Rd and the flag retrieved from the shortcut header of the packet in this entry. If a second packet is transmitted from the access point node Ra to the access point node Rd, the access point node Ra consults its shortcut table and retrieves the entry therein corresponding to the access point node Rd. The flag stored in this entry indicates that the access point node Rd knows a return shortcut path. As such, the access point node Ra transmits the packet directly to the access point node Rd using the PDN subnetwork address of the access point node Rd stored in the corresponding shortcut table entry (and vice-versa).

Illustratively, shortcuts are not formed between two access point nodes for which the sparse communications map already provides a direct base path (without intermediary access point nodes). For example, it is not advantageous to form a shortcut between the access point nodes Ra and Rb. Such a shortcut would be unnecessary and duplicative.

Preferably, shortcut paths are only learned between two access point nodes if they are actively communicating with each other; shortcut paths are not learned between an intermediary access point node and an entry or exit point node. This provides two advantages. First, the storage requirements at each access point node are reduced. This is because shortcuts are not formed between two access point nodes that have not yet, and hence may never, communicate directly with one another.

Second, such a requirement provides for detecting shortcuts which are no longer valid. Because the internet is subject to reconfiguration, it is quite possible that stubs once connected with the PDN 210 via certain access point nodes are no longer accessible by those nodes. If a reconfiguration occurs after a shortcut is stored, it is possible that the shortcut may no longer be valid. For example, suppose the access point node Ra learns a shortcut to the access point node Rd. However, subsequently to learning the shortcut path, the internet 200 is reconfigured such that the access point node Rd no longer connects the stub 306 with the PDN 210. Rather, the access point node Rc connects the stub 306 with the PDN 210.

According to this embodiment, before an entry point node transmits a packet via a shortcut path, it writes its PDN subnetwork address in the PDN subnetwork address field 111-1 of the packet 110 (FIG. 9). This packet is transmitted via a shortcut path to a second access point node which determines whether it is connected to the stub containing the destination node. If not, the second access point node retrieves the PDN subnetwork address of the entry point node from the PDN subnetwork address field 111-1 of the packet 110 (FIG. 9). The second access point node writes this retrieved PDN subnetwork address in the shortcut address field 113-1 of the packet. The second access point node then transmits the packet to the next node on the base path to the exit point node. For example, if the access point node Ra transmits a packet directly to the access point node Rd under the above conditions, the access point node Rd first determines that it is not connected to the stub containing the destination node. Thereafter, the access point node Rd retrieves the PDN subnetwork address of the access point node Ra from the PDN subnetwork header 111 of the packet and writes this address in the shortcut header 113 of the packet. The access point node Rd then transmits the packet to the access point node Rc (which is the next node on the base path to exit point node). Thus, the access point node Rc will learn the shortcut path to the access point node Ra. Furthermore, if shortcut paths can only be learned via the base path, then the access point node Rd writes a flag in the flag field 113-2 of the shortcut header 113 of the packet indicating that the access point node Ra does not know a shortcut path to the access point node Rc. Thus, if a packet is subsequently transmitted from the access point node Rc to the access point node Ra, it will arrive via the base path and will contain the shortcut path to the access point node Rc.

In another embodiment, the access point nodes are adapted to prevent loops from forming in shortcut paths. A loop occurs when a packet returns to an access point node from which the packet has been previously forwarded. If an access point node receives a packet that has the same shortcut address as the node's own PDN subnetwork address then the packet has been previously forwarded from this access point node. For example, this could occur if, subsequently to a first access point node developing a shortcut path, the configuration of the internet 200 changes. If this occurs, the first access point node may erroneously transmit the packet via the shortcut path to a second access point node which is not the exit point node. The second access point node then attempts to reroute the packet via the base path to the exit point node as discussed above. However, the base path from the second access point node to the exit point node could include the first access point node. In this case, the packet returns to the first access point node. To prevent repetition of this error, the first access point node must delete the entry in the shortcut table corresponding to the second access point node and transmit the packet via the base path to the exit point node. The shortcut path from the first access point node to the exit point node can thereafter be learned as described above.

In another embodiment, the shortcuts at each node are purged from time to time. In other words, shortcut table entries not updated within a threshold period of time are erased. This prevents black holes and loops from occurring. A black hole is an access point node from which packets cannot be retransmitted towards their destinations because the access point node is experiencing a hardware or software failure. Illustratively, each entry in the shortcut table has a time stamp indicating when it was last updated. Thus, the access point node can easily scan all of the entries in the shortcut table and delete those having a time stamp that is too old.

In another embodiment, the PDN 210 is a connection-oriented subnetwork. For example, the PDN 210 may be the telephone network. In such a case the invention is modified as follows. Ordinarily, when an exit point node receives a packet via the base path, it retrieves the shortcut address from the packet and stores it in the shortcut table. In a connection-oriented subnetwork, the exit point node first attempts to establish a connection with the entry point node. Illustratively, the exit point node uses the PDN subnetwork address of the entry point node (the shortcut address in the packet) in establishing the connection. After the connection is established, the exit point node stores the shortcut address in the shortcut table.

The present invention can be employed in an internet which has some access point nodes that cannot develop shortcut paths or even receive packets 110 (FIG. 9) that have shortcut headers 113. In such a case, each access point node capable of developing a shortcut maintains a list of other access point nodes which can receive packets with shortcut headers. For example, suppose a first access point node according to this embodiment of the present invention must transmit a packet to a second access point node. Before retransmitting a packet, the first access point node will determine if the second access point node can receive packets with shortcut headers by consulting a list maintained at the first access point node. If the second access point node cannot receive packets with shortcut headers, the first access point node will remove the shortcut header 113 from the packet. (That is, the first access point node will generate a packet 90 such as shown in FIG. 4, and transmit the generated packet to the second access point node.) For example, suppose the access point nodes Ra, Rb and Rd can receive packets with shortcut headers but the access point node Rc cannot. Assume the access point node Ra transmits a packet containing a shortcut header to the access point node Rd via the base path. When the access point node Rb receives the packet, before the access point node Rb retransmits the packet to the access point node Rc, the access point node Rb determines if the access point node Rc can receive packets with shortcut headers. Illustratively, information regarding whether or not the access point node Rc will accept packets containing shortcut headers is stored in its corresponding internet routing table entry, e.g., the entry 122 of the table 120 of FIG. 8. Because the access point node Rc cannot accept such a packet, the access point node Rb generates a packet having a similar structure as the packet 90 of FIG. 4. The access point node Rb then transmits the packet 90 to the access point node Rc. Note that although no shortcut is learned at the access point node Rd, the packet nevertheless arrives at the access point node Rd.

Access point nodes may also maintain a list of "trusted" shortcuts, i.e., a list of other access point nodes to which packets may be transmitted via a shortcut path. For example, suppose the access point node Ra transmits a packet containing its PDN subnetwork address in a shortcut header to the access point node Rd. Illustratively, when the access point node Rd stores the shortcut path to the access point node Ra, it also stores an indication in a trusted shortcut list that packets may be received via a shortcut path from the access point node Ra.

This is advantageous for preventing shortcut entries from being periodically erased from the shortcut table. Assume that a shortcut is established from the access point node Rd to the access point node Ra and from the access point node Ra to the access point node Rd. It is possible that packets may thereafter be transmitted between these nodes via a shortcut path without a shortcut header, i.e., such as the packet 90 of FIG. 4. Because no shortcut is transmitted with the received packets, the corresponding entries in the shortcut table are not updated. Thus, these entries may be erased if the access point nodes periodically erase entries that are not updated within a certain threshold period of time. By providing a list of trusted shortcuts, if a packet is received without a shortcut header, the access point node Ra or Rb may nevertheless update the entry in the shortcut table corresponding to the access point node that transmitted the packet so that the entry is not erased. For example, assume that the access point node Rd subsequently receives a packet from the access point node Ra via a shortcut path without a shortcut header. The access point node Rd checks its trusted shortcut list to determine if the access point node Ra is listed thereon. Because the access point node Ra is listed thereon, the access point node Rd updates the entry of the shortcut table corresponding to the access point node Ra. Thus, this entry bears a time stamp indicating that it was recently updated.

In short, a robust dynamic method is disclosed for determining paths between two stubs connected via a PDN.

Initially, only a base path is provided between a first access point node, which connects a first stub with the PDN, and a second access point node, which connects a second stub with the PDN. When a packet is first transmitted from the first access point node to the second access point node, the first access point node writes its PDN subnetwork address in the packet. This packet is transmitted via the base path to the second access point node. Upon receiving the packet, the second access point node retrieves the PDN subnetwork address from the packet. The second access point node then stores the PDN subnetwork address in, for example, a shortcut table, as a return shortcut path to the first access point node. Thereafter, the second access point node can transmit packets directly to the first access point node using the shortcut address stored in the table as a shortcut path. Shortcuts are thus only established between entry point and exit point nodes, thereby reducing the storage requirements at each access point node. Also, maintenance is minimal as shortcut paths are developed dynamically only when packets are transmitted between access point nodes via the PDN. In addition, the invention does not depend on the particular addressing used in any subnetwork and operates transparently of each subnetwork protocol.

Finally, the above discussion is intended to be merely illustrative of the invention. Numerous other embodiments may be devised by those having ordinary skill in the art without departing from the spirit and scope of the following claims.

I claim:

1. In a communications network comprising a backbone subnetwork including a base path, a plurality of stubs each having a plurality of nodes assigned internet addresses and including at least one access point node that connects said each stub with the backbone subnetwork, and means for providing individual shortcut paths between any two access point nodes, a method for transmitting a packet from a first access point node that connects a first stub containing a source node of the packet with said backbone subnetwork to a second access point node that connects a second stub containing a destination node of the packet with said backbone subnetwork, wherein said first access point node maintains a shortcut table and a base path table, said method comprising the steps of:

at said first access point node, if an entry exists in said shortcut table maintained at said first access pint node, which entry corresponds to the internet address of the destination node of said packet, transmitting a backbone subnetwork address of said first access point node in said packet from said first access point node to said second access point node via a shortcut path using a backbone subnetwork address of said second access point node stored in a retrieved shortcut table entry instead of using said base path, if no shortcut table entry exists, transmitting a backbone subnetwork address of said first access point node in said packet from said first access point node via said base path to said second access point node, and at said second access point node, receiving said packet and storing said backbone subnetwork address of said first access point node contained in said packet in an entry of a shortcut table maintained at said second access point node, which entry corresponds to the internet address of the source node of said packet, and said method further comprising the steps of:

at said first access point node, if no entry exists in said shortcut table maintained at said first access point node corresponding to the destination node of said packet, transmitting a flag in said packet indicating that said first access point node does not know a shortcut path to said second access point node, and at said second access point node, storing said flag contained in said packet in said shortcut table entry maintained at said second access point node.

2. The method of claim 1 further comprising transmitting a second packet from said second access point node to said first node by the steps of:

at said second access point node, if said shortcut table entry corresponding to the internet address of said destination node of said second packet contains a flag indicating that said first access point node does not know a shortcut path to said second access point node, transmitting a backbone subnetwork address of said second access point node in said second packet from said second access point node via said base path to said first access point node, and at said second access point node, if said shortcut table entry does not contain said flag, transmitting said second packet to said first access point node using said backbone subnetwork address stored in said shortcut table entry as a shortcut path.

3. In a communications network comprising a plurality of stubs each having a plurality of nodes assigned internet addresses and including an access point node, a base path sequentially connecting said access point nodes, each of said access nodes having a base path address, and shortcut direct paths between any two access point nodes, a method for establishing direct intercommunication over a shortcut path between a first access point node that connects a first stub containing a source node transmitting a packet and a second access point node that connects a second stub containing a destination node of the packet, said method comprising the steps of:

at said first access point node, transmitting said packet over said base path through at least one intermediate node to said second access point node, at said second access point node, receiving said packet via said base path and storing the base path address of said first access point node contained in said packet in an entry of a shortcut table maintained at said second access point node, whereby said second access point node has learned the shortcut path and has stored it in said shortcut table for future use in communications between said first and second access point nodes of packets to be transmitted between said source and destination nodes, said entry of said shortcut table corresponding to the internet address of the source node of said packet;

transmitting a second packet from said second access point node to said first access point node via the shortcut path between said first and second access point nodes using said base path address of said first access point node stored in said shortcut table entry instead of transmitting said second packet via said base path, and wherein said communications network is reconfigured such that a third access point node connects said first stub with said base path but said first access point node no longer connects said first stub with said base path, said method further comprising the steps of:

receiving said second packet at said first access point node, at said first access point node, writing the base path address of said second access point node and a flag indicating that said second access point node does not know a shortcut path to said third access point node in said second packet, and transmitting said second packet from said first access point node to said third access point node via said base path.

4. In a communications network comprising a backbone subnetwork and a plurality of stubs each of which is connected with said backbone network by an access point node, one or more of said access point nodes including a memory for storing a base path table defining a base path in said backbone subnetwork to each other access point node and a shortcut table with a shortcut path entry defining a shortcut path in said subnetwork to one or more other access points, the method for causing a specific access point node to learn the shortcut path between said specific access point node and another access point node and storing an identification of said shortcut path in the shortcut table of said specific access node for future use of said shortcut path in communications of packets between said specific access point node and said another access point node, said method comprising the steps of:

transmitting a packet from said another access point node to said specific access point node over a base path through a least one intermediate node, and at said specific access point node, receiving said packet via said base path and storing the base path address of said another access point node contained in said packet in an entry of said shortcut table maintained at said specific access point node, whereby subsequent transmission from said specific access point node to said another access point node occurs via said shortcut path in said backbone network if a shortcut entry corresponding to said another access point node exists in said shortcut table at said specific access point node and subsequent transmission to said another access point node occurs via a base path defined in said base path table at said specific access point node if no shortcut entry exists in said shortcut table at said specific access point node.

* * * * *